United States Patent Office 3,487,936
Patented Jan. 6, 1970

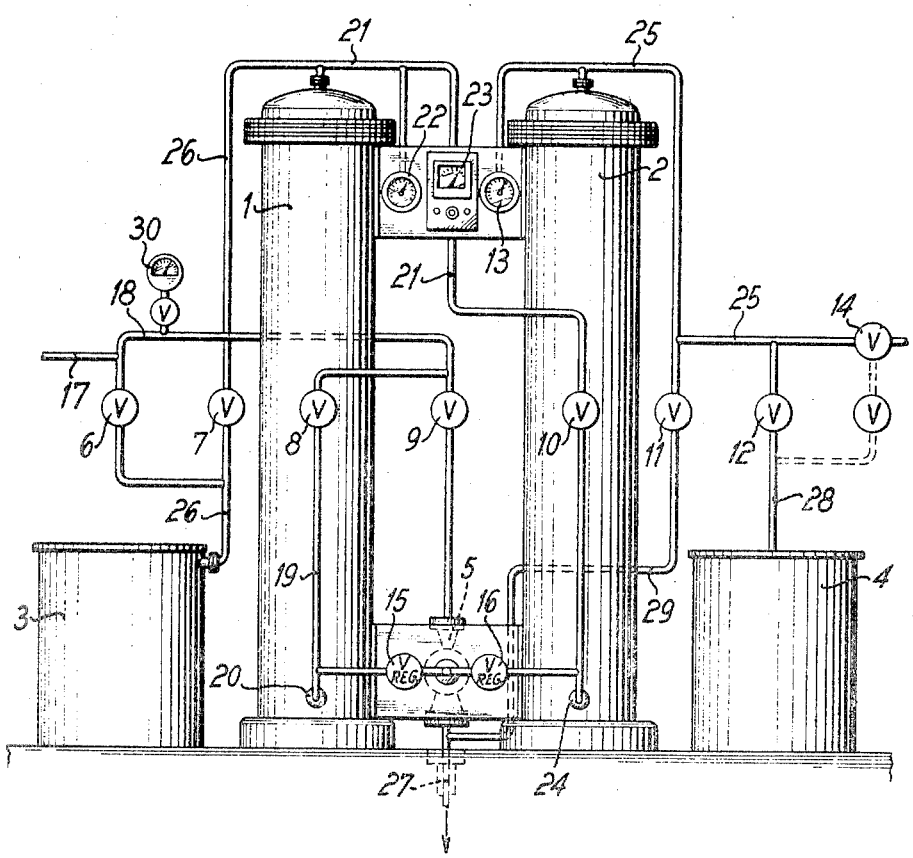

3,487,936
APPARATUS FOR REGENERATING THE FILTERS OF A TWO-COLUMN COMPLETE-DESALINATION PLANT
Karl-Heinz Klein, Mannheim, Germany, assignor to Karl Klein & Sohn, Mannheim, Germany, a corporation of Germany
Filed Apr. 27, 1967, Ser. No. 634,172
Claims priority, application Germany, Jan. 18, 1967, K 61,202
Int. Cl. B01d 29/38
U.S. Cl. 210—191     1 Claim

ABSTRACT OF THE DISCLOSURE

In a two-column complete desalination plant having a cationic filter and an anionic filter it is necessary to regenerate the ion exchange resins by treatment with a dilute acid and a dilute alkali. Distinct advantages accrue from a method according to which these regeneration liquids are charged simultaneously into the exchangers and simultaneously are discharged from the exchangers. The flow of the regenerating liquids and of the necessary rinse water is effected by means of a water jet pump.

---

This invention relates to the desalination of raw water containing dissolved salts, and is concerned with the provision of an apparatus for regenerating the filters of a two-column complete desalination plant wherein acids and alkalies, diluted with water, are used for the regeneration. The invention is distinguished by the fact that the dilute acid and the dilute alkali are charged simultaneously into the exchangers and are discharged simultaneously from the exchangers.

The apparatus consists essentially in that the supply and and discharge of diluted acids and alkalies, respectively, are effected by means of a water jet jump, the water jet pump preferably being arranged behind the cation and anion filters.

According to the invention I can also proceed in this way: an acid tank and an alkali tank are assigned to each exchanger, a first conduit leading from the acid tank to the cation exchanger and from there a second conduit leading, via a dosing valve, to the suction side of the water jet pump; and that the alkali tank is connected by a third conduit with the anion exchanger and the latter by a fourth conduit, via an additional dosing valve, with the suction side of the water jet pump, while the water jet pump is connected to the raw water supply by a fifth conduit.

Known small-scale full desalination plants are regenerated by means of two dilution injectors. The regeneration is effected by first charging the cation exchanger with dilute acid, and thereafter regeneration of the anion filter is effected with dilute soda lye. The staggered regeneration is necessary since debased ("entbastes") water is used for the alkali dilution injector, which is only available when the cation filter is regenerated. Such a procedure has the disadvantage that the regenerating time is very long; also, that no neutral waste water can be obtained, and that the waste water must be subsequently neutralized at considerable expense.

The object of the present invention is to avoid these disadvantages by conducting the acid dilute acid and the dilute alkali simultaneously through the exchangers by means of a water jet pump and neutralizing them inside the water jet pump. The regenerating currents and their neutralization can be exactly adjusted by dosing valves. This results in considerable advantage, since a much shorter regenerating time can be achieved, and since the waste water can flow off neutralized.

Other features of the invention will be apparent from the following description of an embodiment of the invention in connection with the drawing and the appended claims.

In the drawing, the single figure is a diagrammatic representation of a plant for use in carrying out the present invention.

The two-column complete desalination plant represented in the drawing consists of a cation exchanger 1 and an anion exchanger 2, which exchangers or filters contain the exchanger resins, as well as of an acid tank 3, an alkali tank 4 and a water jet pump 5. These various units are connected with each other over pipe lines, or conduits, and fittings. In the carton- and anion filters of the full desalination plants, the salts are removed from the water by ion exchange, the cation filter exchanging the calcium-magnesium- and sodium ions against the equivalent amount of H-ions, while the anion filter exchanges sulfates, chlorides and nitrates as well as anions of the weak mineral acids against the equivalent amount of OH-ions. Raw water to be treated arrives through conduits 17, 18, a valve 8 and a conduit 19 at point 20 in the cation exchanger 1, and traverses the latter in an ascending direction. At the upper end of the cation exchanger 1 the water flows through a conduit 21, a conductometer and a valve 10 at point 24 into the anion exchanger 2. The water traverses the anion exchanger 2 again in an ascending direction, is given off through conduit 25 and valve 14 as completely desalted water. A monometer 13 is arranged at the outlet of the cation exchanger 1 and at the outlet of the anion exchanger 2 to supervise the operation, while an additional monometer 30 is arranged in the raw water supply.

When the exchange capacity is exhausted—which condition can be recognized by a showing of high conductance in the conductometer 23—the cation filter and the anion filter must be regenerated. To this end the alkali tank 4 is filled with desalted water, but which is no longer sufficient for the operation, by opening the valves 8, 10, 12 while the acid tank is filled with raw water by opening the valve 6. Acid and alkali respectively are now added to the tanks, so that the plant is prepared for the regeneration of the filters.

The water jet jump 5 is started by opening the valve 9. The water jet pump draws the dilute acid through valved conduit 26, from the top of the cation exchanger 1 and arrives over point 20 and the dosing valve 15 at the outlet 27. At the same time the dilute alkali is sucked from the top of the anion exchanger 2 through the conduit 28, valve 12 and conduit 25, and finally arrives at point 24 and the dosing valve 16 at the outlet 27. The two dosing valves 15, 16 permit one exactly to adjust the delivery of the two regenerating agents and thus to discharge the completely neutralized water into the canal. After regeneration, the valves 7, 9, 12, 15, 16 are closed.

In order to make the plant ready again, the filters must be rinsed in order to remove the acid and alkali residues. To this end the acid tank 3 is first filled with raw water, as described above, and at the same time the alkali tank 4 is filled with desalted water. This is followed by regeneration, which is effected in the same manner as the regeneration proper.

Finally there is quick rinsing operation, during which the plant is run as in normal operation and with the valve 14 closed, the desalted water is rejected as waste water, via the valve 11 and the conduit 29, until the desired conductance is attained.

What I claim is:
1. Apparatus for regenerating the filters of a two- column complete desalination plant comprising a cationic exchanger and the suction side of said jet pump, a second nicating with the cation exchanger, an alkali tank communicating with the anion exchanger, a water jet pump, a first means affording communication between the cation exchanger and the suction side of said jet pump, a second means affording communication between the anion exchanger and the suction side of said jet pump, dosing valves disposed in said first and second communication means for controlling the quantity of acid and alkali passing from said tanks to said exchangers, said jet pump being connected to the supply of water whereby the exchangers may be regenerated simultaneously.

References Cited

UNITED STATES PATENTS

| | | | |
|---|---|---|---|
| 2,422,054 | 6/1947 | Tiger | 210—191 X |
| 2,771,424 | 11/1956 | Stromquist et al. | 210—190 X |
| 3,056,502 | 10/1962 | Zwicky | 210—190 |
| 3,143,500 | 8/1964 | Damgaard | 210—279 X |
| 3,151,070 | 9/1964 | Corte | 210—190 |
| 3,197,401 | 7/1965 | Arai | 210—37 X |

SAMIH N. ZAHARNA, Primary Examiner

U.S. Cl. X.R.

210—253, 258

PO-1050
(5/69)

UNITED STATES PATENT OFFICE
CERTIFICATE OF CORRECTION

Patent No. 3,487,936        Dated January 6, 1970

Inventor(s) Karl-Heinz Klein

It is certified that error appears in the above-identified patent and that said Letters Patent are hereby corrected as shown below:

In the Claim of the patent, column 3, line 2, after the word "exchanger" the following has been omitted:

-- an anionic exchanger, an acid tank communicating with the cation exchanger, an alkali tank communicating with the anion exchanger, a water jet pump, a first means affording communication between the cation exchanger --

SIGNED AND
SEALED
JUN 9 1970

(SEAL)
Attest:

Edward M. Fletcher, Jr.
Attesting Officer

WILLIAM E. SCHUYLER, JR.
Commissioner of Patents